United States Patent

Ryan

[15] 3,700,041
[45] Oct. 24, 1972

[54] POSITION CONTROL FOR PARALLEL HYDRAULIC SYSTEMS ON AN AGRICULTURAL IMPLEMENT

[72] Inventor: Edward Clyde Ryan, 341 Eastlawn Drive, Ankeny, Iowa 50021

[22] Filed: Oct. 23, 1970

[21] Appl. No.: 83,677

Related U.S. Application Data

[62] Division of Ser. No. 812,577, March 28, 1969, Pat. No. 3,583,284.

[52] U.S. Cl. ............172/316, 172/322, 172/413
[51] Int. Cl. .................A01b 63/14, A01b 63/22
[58] Field of Search........172/322, 44, 311, 316, 413, 172/450, 491, 668; 60/52 HE, 97 E; 91/189

[56] References Cited

UNITED STATES PATENTS

| 3,515,219 | 6/1970 | Jackson et al. | 172/44 X |
| 3,583,284 | 6/1971 | Ryan | 172/44 X |
| 3,583,495 | 6/1971 | Cantral et al. | 172/413 X |
| 3,627,053 | 12/1971 | Hook et al. | 172/413 X |

Primary Examiner—Robert E. Pulfrey
Assistant Examiner—Stephen C. Pellegrino
Attorney—William A. Murray

[57] ABSTRACT

A flexible rod weeder in which the weeder rods are raised and lowered by rocking the frame about the forward wheels. A plurality of gauge wheels are connected to the rear of the frame through extensible and retractable hydraulic motors so that by extending and retracting the motors, the frame is rocked about the forward wheels. The hydraulic motors are connected in parallel and are provided with an adjustable stop which will prevent the lowering of the weeder rods beyond a predetermined position, but permit the flow of fluid from one motor to another so that the gauge wheels equally share the weight of the rear of the frame.

6 Claims, 7 Drawing Figures

PATENTED OCT 24 1972 3,700,041

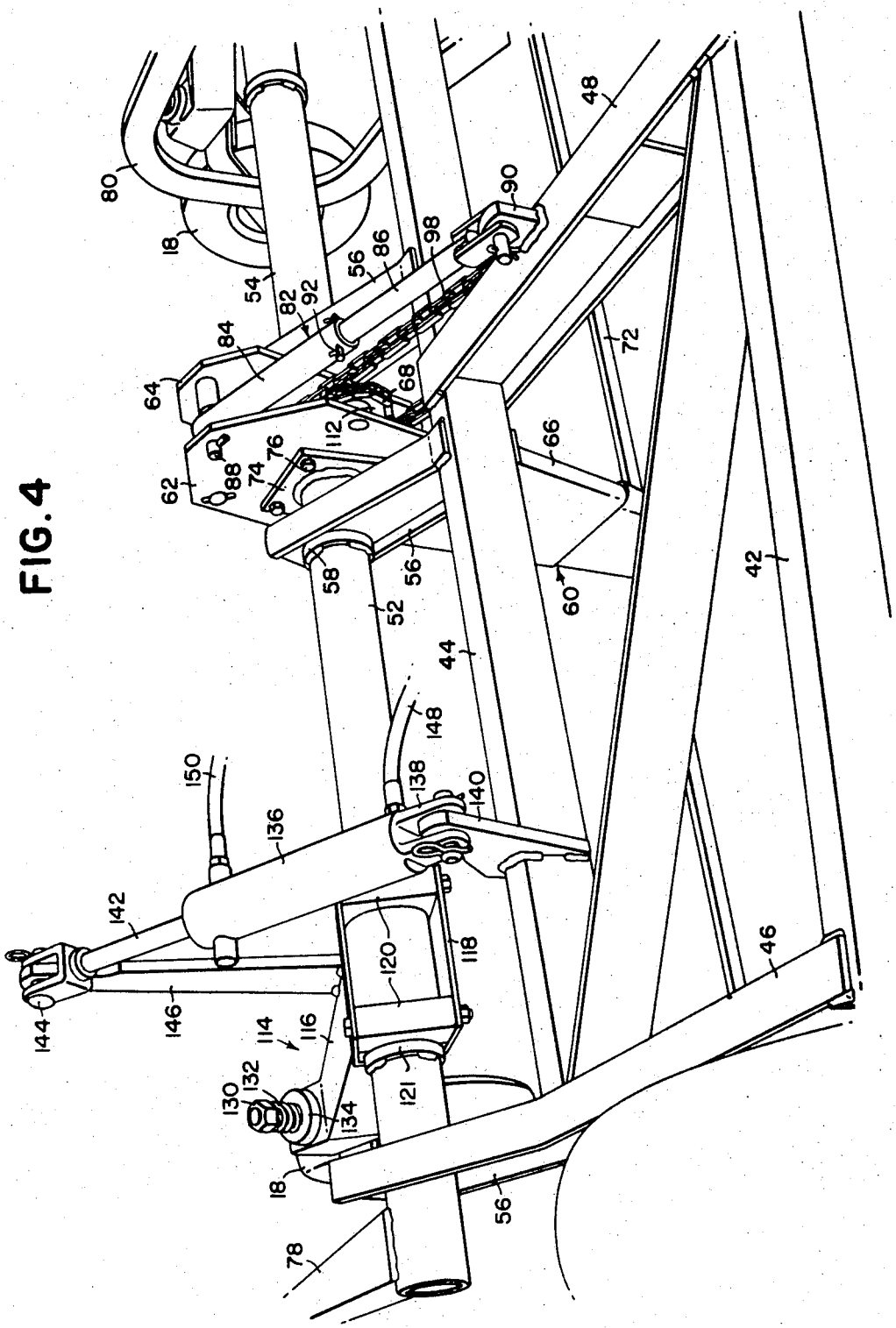

POSITION CONTROL FOR PARALLEL HYDRAULIC SYSTEMS ON AN AGRICULTURAL IMPLEMENT

CROSS-REFERENCE TO RELATED APPLICATION

This is a division of application, Ser. No. 812,577, filed Mar. 28, 1969, now U.S. Pat. No. 3,583,284.

BACKGROUND OF THE INVENTION

The present invention relates to hydraulic systems which have a plurality of hydraulic motors connected in parallel, and more particularly relates to means for controlling the total extent of movement of the movable parts of a plurality of hydraulic motors which are connected in parallel.

The embodiment of the invention disclosed herein finds great utility in connection with the control of the raising and lowering movements of certain agricultural implements such as rod weeders. In the ordinary situation, the agricultural implement such as a rod weeder is drawn by a tractor and has a plurality of weeder rods adjustable vertically between transport and working positions by rocking the frame about a plurality of forward wheels. A plurality of gauge wheels are connected to the rear of the frame through extensible and retractable hydraulic motors so that by extending and retracting the motors, the frame is rocked about the forward wheels. In order that the gauge wheels equally share the weight of the rear portion of the frame, the motors are connected in parallel, and so that the motors can be actuated by the tractor operator, they are also connected to the tractor fluid pressure system which includes the distributing valve, a hydraulic pump and a fluid reservoir.

In the operation of a tractor-implement unit of the type described generally above, it is necessary for the operator to actuate the fluid pressure system at the end of each pass through a field to effect raising of the weeder rods from their ground-working positions so that the unit can be turned about to make an adjacent and parallel path through the field. It is desirable in many instances such as these that means be provided to enable the operator to lower the weeder rods to the same ground-working position as before. However, while it is well known to provide hydraulic motors with adjustable stops to determine the extent of relative movement between the movable parts of the motor, all of the stop means heretofore known have been designed for single cylinders or for cylinders used in series and function to lock the movable parts of the motors when the motors have been extended or retracted to the predetermined position. If the stop means of the above-described type were used with the parallel connected hydraulic motors of a rod weeder of the type generally described above, the floating action inherent in parallel connected hydraulic motors would no longer be available and the gauge wheels would equally share the weight of the rear portion of the rod weeder frame only in the ideal situation where the ground surface beneath the rod weeder frame is perfectly level.

SUMMARY OF THE INVENTION

The primary object of the present invention is to provide an improved hydraulic system which includes a plurality of extensible and retractable hydraulic motors connected in parallel and limit or control means which prevents simultaneous extension or retraction of all the motors after one of the motors has been extended or retracted a predetermined distance, but will permit extension or retraction of less than all the motors as long as it is accompanied by simultaneous retraction or extension respectively of one or more of the motors.

A further object of the present invention is to provide a hydraulic system having a plurality of extensible and retractable hydraulic motors connected in parallel and including adjustable control means which limits the total extent of relative movement in any given direction of the extensible and retractable parts of the hydraulic motors.

According to the present invention, a plurality of double-acting extensible and retractable hydraulic motors have their anchor and rod ends connected in parallel by first and second fluid lines respectively, and the first and second fluid line means are alternately connectible through third and fourth fluid line means respectively to a source of fluid pressure and a fluid reservoir. A valve member movable between open and closed positions is interposed in the third fluid line means and moves to the open position in response to fluid pressure within the third fluid line means when the third and fourth fluid line means are connected to the source of fluid pressure and the reservoir respectively. A push rod is mounted on one of the motors and is responsive to the retraction of that motor to a predetermined position to move the valve member to the closed position to prevent exhaust of fluid through the third fluid line means. With the valve member in the closed position, additional retraction of one or more of the motors is accompanied by extension of one or more of the motors.

According to another feature of the invention, a yieldable means is positioned between the extensible and retractable part of the hydraulic motor and the push rod for moving the valve member to the closed position so that the push rod will not prevent additional retraction of the motor beyond the predetermined position provided the retraction of that motor is accompanied by extension of one or more of the other motors.

Other objects and important features inherent in and encompassed by the invention will become apparent to those skilled in the art from a reading of the following detailed description of the preferred embodiment of the invention when taken in conjunction with the accompanying drawings.

BRIEF DESCRIPTION OF THE DRAWINGS

In the drawings:

FIG. 4 is a perspective view illustrating a portion of the rod weeder embodying the principles of the present invention;

DESCRIPTION OF THE PREFERRED EMBODIMENT

Figure 1:
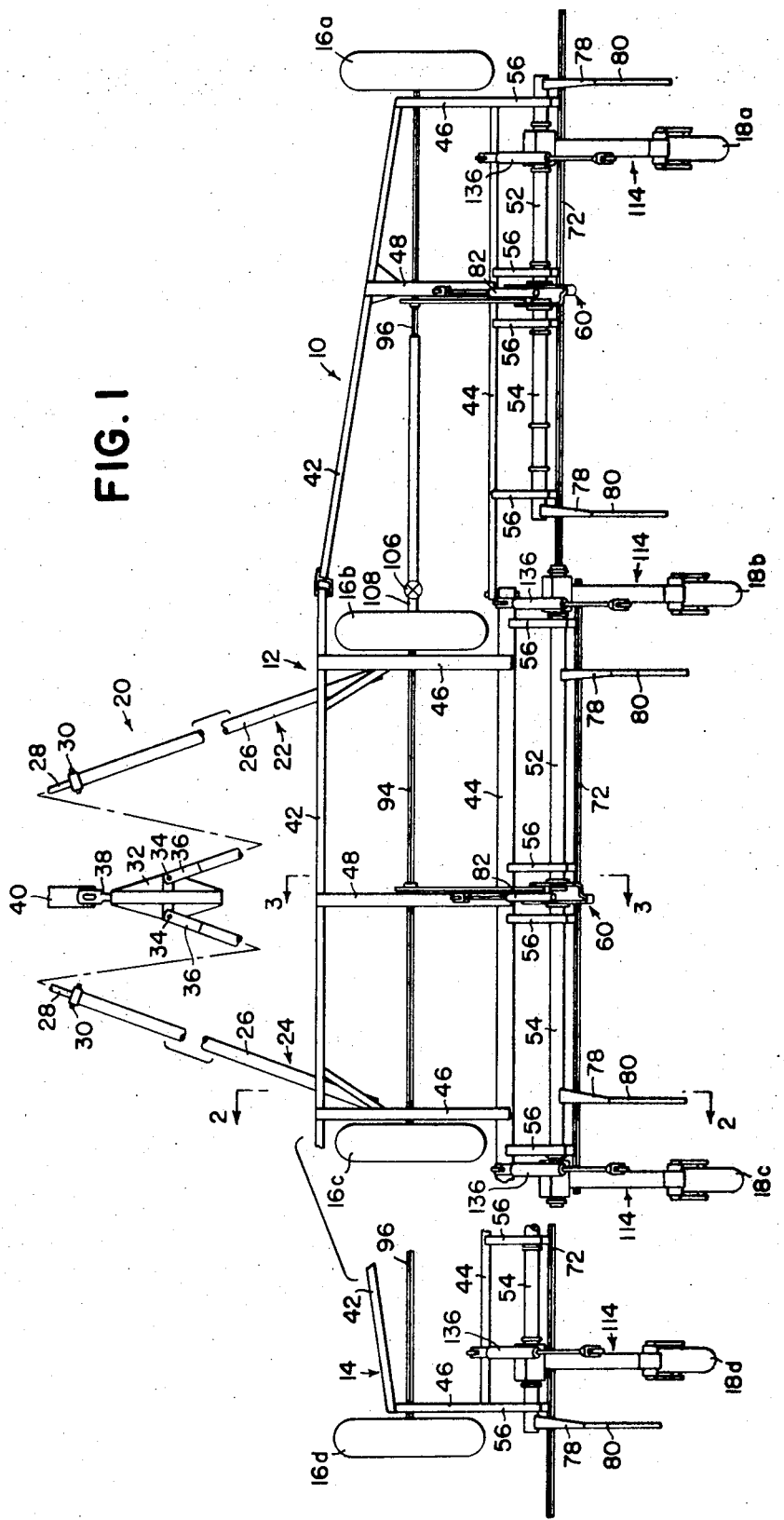
FIG. 1 is a plan view of a rod weeder in which the principles of the present invention have been incorporated.

In the following description, right-hand and left-hand reference is determined by standing at the rear of the implement and facing in the direction of travel.

Referring now to the drawings, the illustrated rod weeder is formed of a plurality of subframes indicated generally at 10, 12 and 14. The subframes are supported by front ground engaging wheels 16a, 16b, 16c and 16d and rear gauge wheels 18a, 18b, 18c and 18d. The front ground wheels 16 are fixed relative to the subframes 10, 12 and 14, and the rear gauge wheels 18 are movable relative to the subframes in a manner which will be more fully set forth below.

Hitch means indicated generally at 20 is secured to the forward end of the frame and includes right and left telescoping pole members 22 and 24. Each of the hitch poles 22 and 24 include a rear hollow member 26 and a forward member 28 which can telescope within the hollow member 26. The member 26 is apertured at its forward end and carries a pin 30 which can be disposed within a suitable aperture in member 28 to hold the pole in its desired length. The hitch poles 22 and 24 are secured to a hitch plate 32 by hitch pins 34 which pass through a clevis 36 at the forward end of each pole and also through a corresponding aperture in the hitch plate 32. The forward end of the hitch plate 32 carries a clevis 38 which is secured to a tractor drawbar 40 in any suitable manner.

Each of the subframes includes a forward generally transversely extending frame member 42 and a rear transversely extending frame member 44. The frame members 42 and 44 are interconnected by outer longitudinally extending frame members 46 and intermediate longitudinally extending frame members 48. The hitch poles 22 and 24 are pivotally secured to mounting beams 50 (FIG. 2) depending from the frame members 46 on the center subframe.

Each of the subframes 10, 12 and 14 is provided with a rockshaft formed of right- and left-hand sections 52 and 54, respectively. Each of the rockshaft sections is supported by a pair of apertured frame members 56 which are secured to and extend rearwardly from the rear transversely extending frame member 44. Each of the frame members 56 is provided with a cylindrical bearing 58 in which the rockshaft sections 52 and 54 are rotatably disposed. The two rockshaft sections 52 and 54 are joined together by a boot indicated generally at 60. Each boot has right and left upper members 62 and 64 respectively, which are joined at their lower ends by a lower tubular member 66 in which is disposed a drive chain 68 and a sprocket 70, the weeder rod 72 passing through an aperture of the same cross section as the weeder rod in the sprocket 70. To facilitate the securement of the rockshaft sections 52 and 54 to the boot 60, the rockshaft sections are provided with facing flanges 74 which are secured in any suitable manner such as bolts 76 to the upper members 62 and 64 of the boot. Welded or otherwise suitably secured to the outer end of each rockshaft section 52 and 54 is an attaching bracket 78 to which a weeder rod support in the form of a gooseneck pendant 80 may be secured.

Means are provided to permit the weeder rod 72 to swing upwardly and rearwardly should an obstruction be encountered. To this end a telescoping link assembly 82 which includes a barrel member 84 and a rod 86 telescopically received within the barrel member 84 has its barrel end 84 pivotally secured to a transversely extending pin 88 carried between the right- and left-hand members 62 and 64 of the boot, the rod 86 of the link assembly being pivotally secured to a lug 90 carried by the intermediate longitudinally extending frame member 48. A shear pin 92 passes through aligned apertures in the members 84 and 86 to hold them in their extended position under normal load conditions. Should the weeder rod strike an obstruction, the pin 92 would be sheared and the weeder rod would move upwardly and rearwardly by rotating about the axis of the rockshaft sections.

Each of the weeder rods 72 is driven from the ground wheels 16 by means of a jackshaft 94 or 96 and a drive chain 98, the drive chain 98 passing over the sprocket 100 on the jackshaft and a sprocket 102 on the boot, the sprocket 102 being concentric with a second sprocket 104 over which the drive chain 68 passes. The jackshaft 94 for the center section 12 which carries two wheels 16b and 16c is interconnected with both wheels by means of one-way ratcheting drives so that the rod weeder is turned, the jackshaft will be driven by the wheel that moves the fastest. The jackshafts 96 which are associated with the outer subframes 10 and 14 are of telescoping construction and have universal joints 106 which connect them to subshafts 108 with the wheels on the center subframe 12. As in the case with jackshaft 94, the jackshafts 96 are also driven from the right and left wheels through one-way ratcheting drive clutches.

While the drive chain 98 passes around its associated sprocket 102, the drive chain 68 only passes over its sprocket 104, but is held in place by idlers 110 and 112, one of which may be adjustable to maintain the proper tension in the drive chain 68.

The gauge wheels 18 are carried by support structure indicated generally at 114, each gauge wheel supporting structure including an arm member 116 which is fixedly secured at its upper end to a C-shaped member 118 which carries a bearing block 120. Each of the bearing blocks 120 is rotatably disposed about the associated rockshaft section 52 and 54 and is held in place from lateral movement by rings 121 (FIG. 4) welded to the rockshaft section.

The lower end of the arm 116 has a sleeve portion 122 which receives an upwardly extending spindle 124 secured to a yoke 126 which carries an axle member 128. The upper end of the spindle is threaded and receives a nut 130 which bears against a spring 132 to hold a detent block 134 against the upper edge of the sleeve 122. The detent block 134 is keyed to the spindle 124 and normally holds the wheels 18 in the fore-and-aft position shown in FIG. 2, but permits it to caster when sufficient turning force is imposed upon the wheel.

Figure 2:
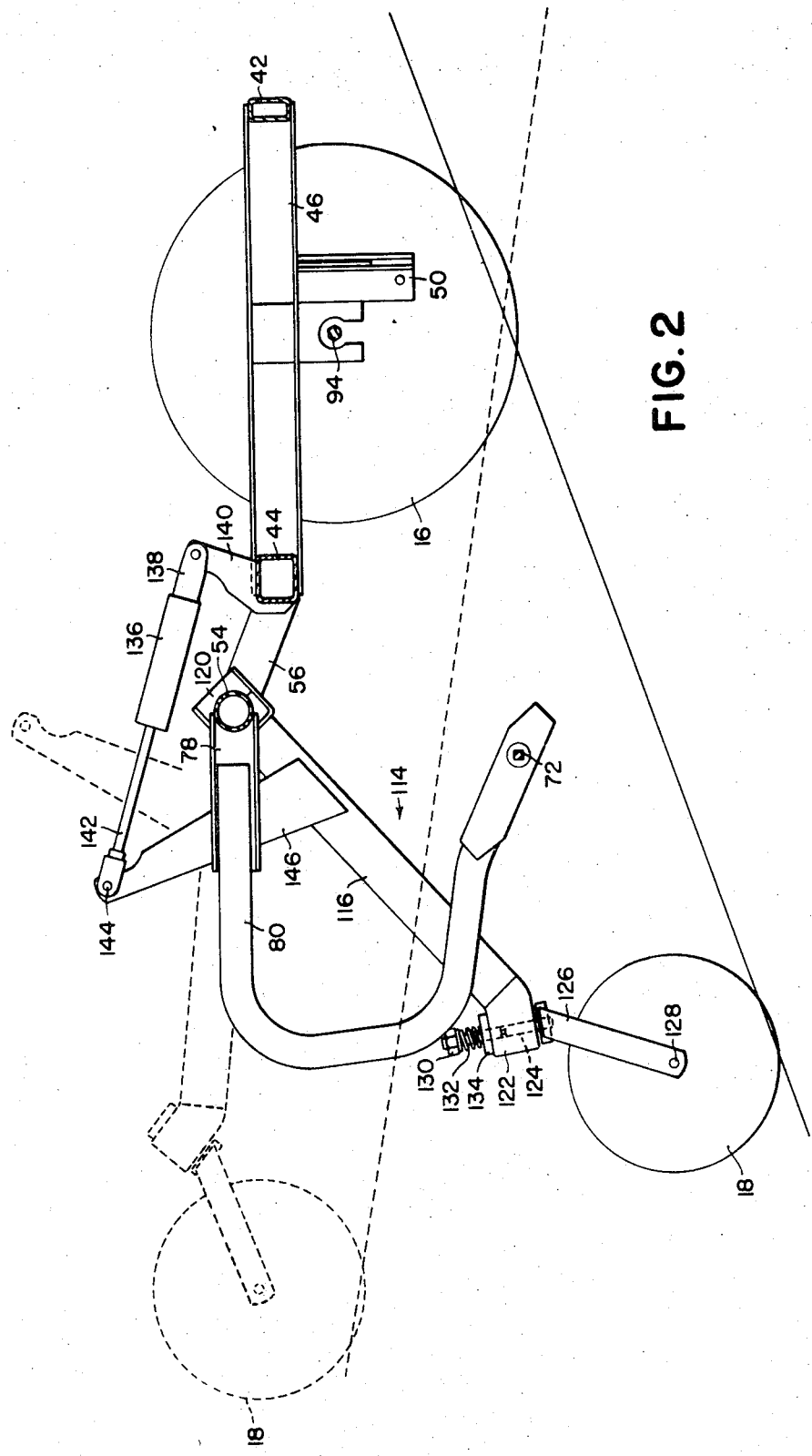
FIG. 2 is a sectional view taken along a line 2—2 of FIG. 1, the rod weeder being illustrated in its field transport position in full lines and in its field working position in broken lines.
Figure 3:
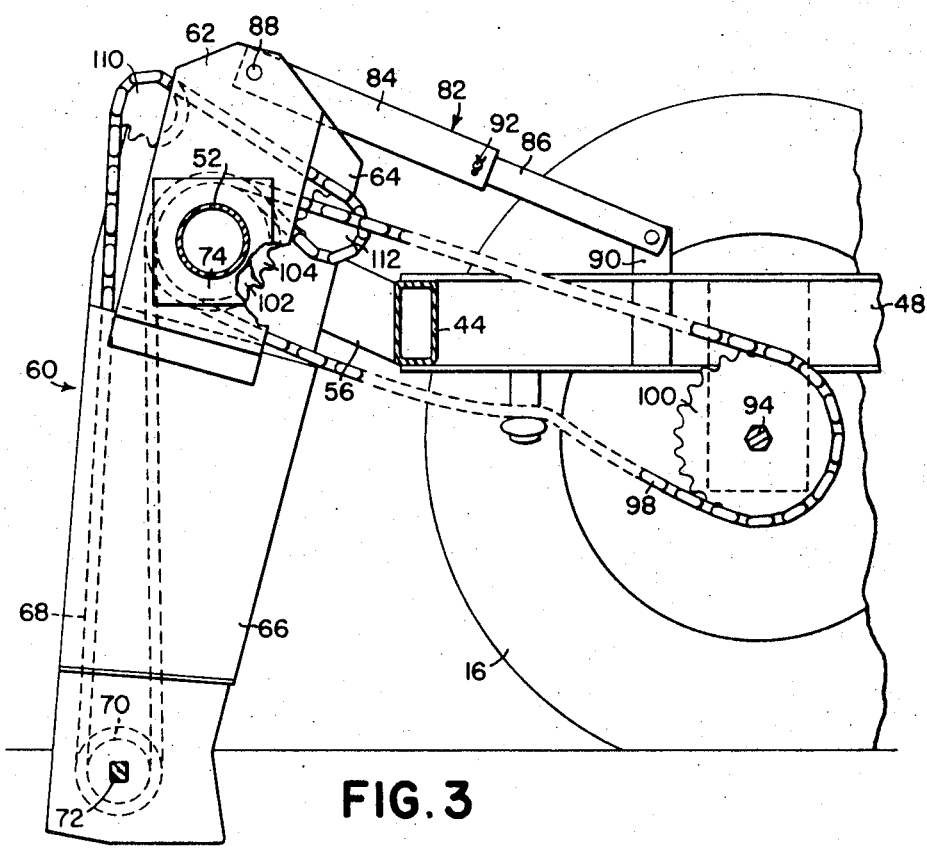
FIG. 3 is a sectional view taken substantially along the line 3—3 of FIG. 1.

The gauge wheels 18 can be moved vertically with respect to the frame to rock the frames about the wheels 16 between a transport position illustrated by the solid lines in FIG. 2 and a working position illustrated by the dotted lines in FIG. 2. To this end, the gauge wheels 18a, 18b, 18c and 18d are provided with extensible and retractable double-acting hydraulic cylinders 136a, 136b, 136c and 136d. The anchor end 138 of each cylinder is secured to an upstanding lug 140 mounted on the rear frame member 44 and the rod end 142 of each cylinder is pivotally connected by a bolt 144 to a mounting bracket 146 secured to the arm 116.

Figure 5:
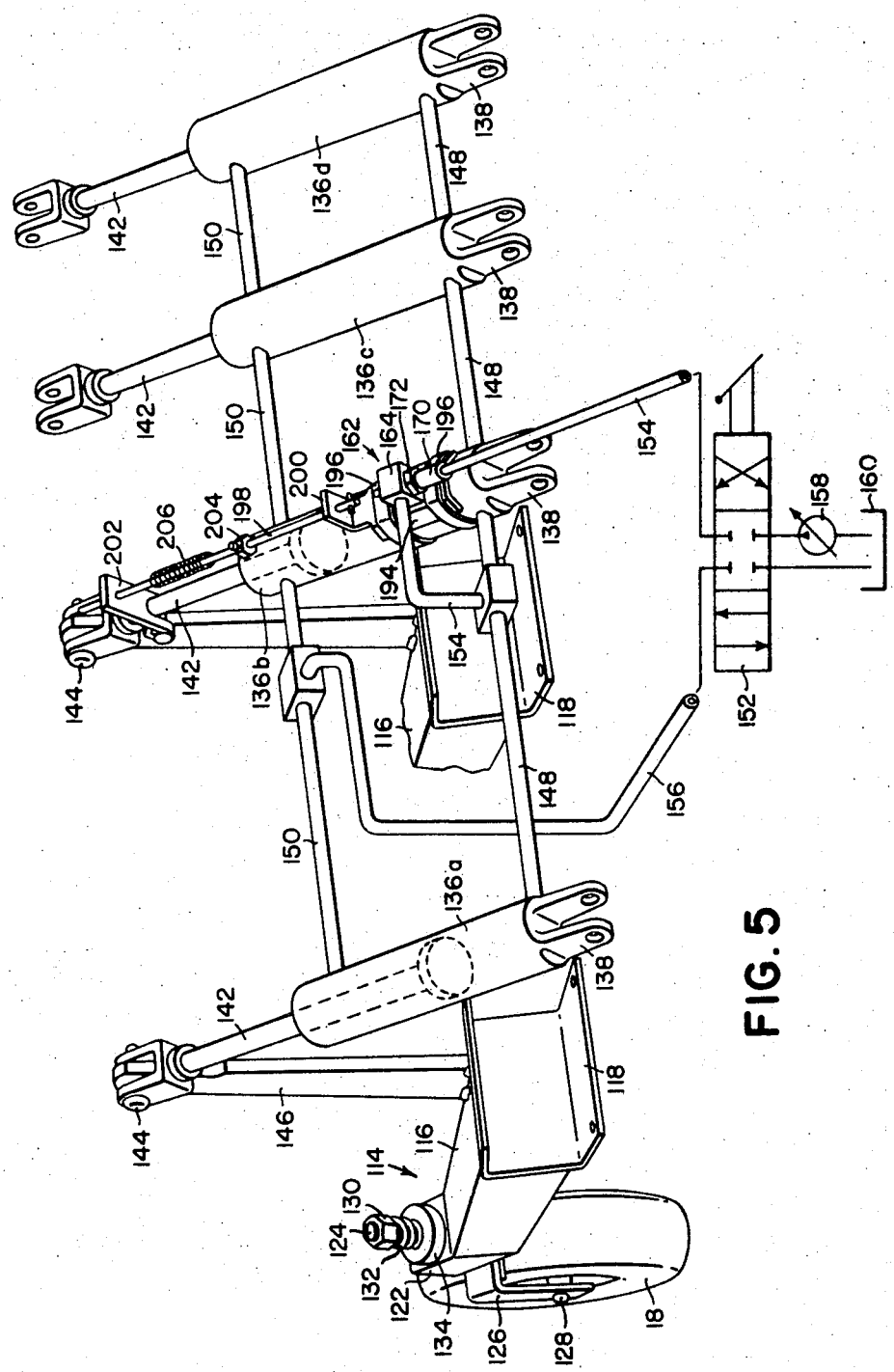
FIG. 5 is a perspective view illustrating a hydraulic depth control system according to the present invention.

As can best be seen in FIG. 5, the anchor ends of the cylinders 136 are interconnected by first fluid lines 148 and the rod ends of the cylinders 136 are interconnected by second fluid lines 150. The fluid lines 148 and 150 are connected to one side of a directional flow control valve 152 by fluid lines 154 and 156 respectively, while the opposite side of the directional flow control valve 152 is connected to a pump 158 and a fluid reservoir 160. The fluid lines 148 and 154 provide a parallel connection between the anchor ends of the cylinders 136 and the valve 152, while the fluid lines 150 and 156 provide a parallel connection between the rod ends of the cylinders 136 and the valve 152. When the valve 152 is moved to the right as viewed in FIG. 5, fluid pressure is supplied to the anchor ends of the cylinders 136 to extend the rods to move the weeder rod 72 to the transport position. When the valve 152 is moved to the left, the rod ends of the cylinders 136 are supplied with fluid pressure to retract the rods 142 to lower the weeder rods 72 to the working position. With the parallel connections between the cylinders 136, the gauge wheels 18 will equally share the weight of the rear portion of the frames since, should any gauge wheel travel over a mound or the like which would place it in a position higher than the other gauge wheels, the rod 142 of the associated cylinder 136 would be forced inwardly forcing fluid into the other cylinders to extend their rods until the even distribution of weight is again obtained.

Figure 7:
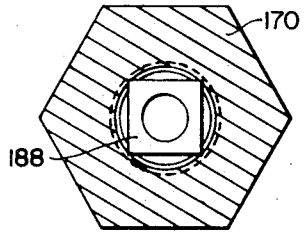
FIG. 7 is a sectional view taken substantially along the line 7—7 of FIG. 6.
Figure 6:
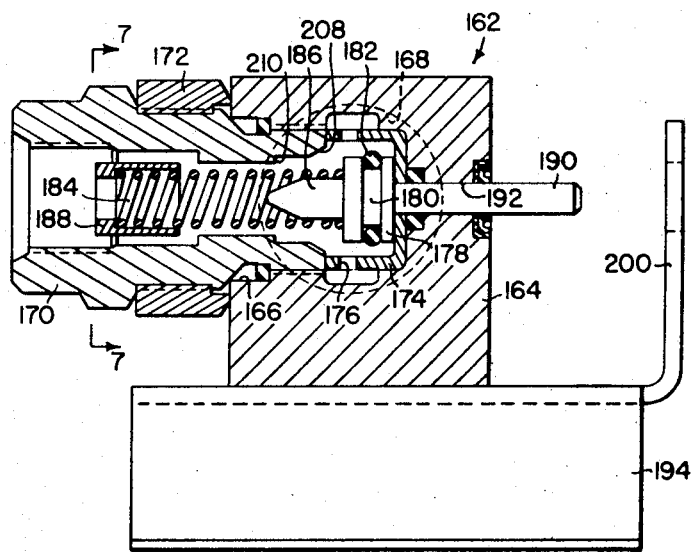
FIG. 6 is a sectional view of a valve member used in the hydraulic depth control system illustrated in FIG. 5.

According to the invention, the hydraulic system for controlling the vertical movement of the gauge wheels with respect to frames is provided with a novel adjustable stop mechanism which prevents the exhaust of fluid from the anchor ends of the cylinders after the rod 142 of one of the cylinders has been retracted to a predetermined position, but retains the floating characteristic of parallel connected cylinders so that the even distribution of weight on the gauge wheels is maintained. The adjustable stop mechanism is illustrated in FIGS. 5–7 and includes a valve indicated generally at 162. The valve 162 is interposed in the fluid line 154 and is mounted on the cylinder 136b in a manner which will be more fully explained hereinafter. The valve 162 includes a block portion 164 which is provided with intersecting bores 166 and 168. The bore 166 is threaded and receives one end of a nipple 170 and the bore 168 is threaded to receive a portion of the fluid line 154. The nipple 170 is retained within the bore 166 by a locknut 172, and the outer end of the nipple is internally threaded to receive a portion of the fluid line 154.

The inner end of the nipple 170 engages the lip of a cup-shaped member 174 which is positioned within the inner end of the bore 166 and limits the insertion of the nipple 170 into the bore 166. The cup-shaped member 174 has a larger internal diameter than the nipple 170 so as to provide an enlarged area adjacent the inner end of the hollow nipple. A plurality of openings 176 provided within the walls of the cup-shaped member 174 establish fluid communication between the bore 168 and the bore of the hollow nipple.

A plunger 178 is mounted within the bore 166 for movement between a closed position in which it extends into the hollow nipple and an open position in which it is positioned within the enlarged area provided by the cup-shaped member 174. The plunger 178 has a diameter of a size to slidably but snugly fit within the inner end of the hollow nipple 170. Intermediate its ends, the plunger 178 is provided with an annular recess 180 which carries a sealing ring 182 so that when the plunger 178 is moved within the inner end of the hollow nipple 170, the flow of fluid through the hollow nipple is prevented. The plunger 178 is normally biased to the enlarged area provided by the cup-shaped member 174 by a compression spring 184. One end of the spring 184 extends over a spring guide 186 projecting from one end of the plunger 178 while the opposite end of the spring acts against a shoulder provided within a hollow spring guide 188. The hollow spring guide 188 is square and, as best illustrated in FIG. 7, is provided with threaded corners so that it can be turned into the threaded outer end of the hollow nipple 170. A plunger stem 190 extends from the end of the plunger 178 opposite from the spring guide 186 and extends through a small bore 192 provided in the valve block 164 coaxially with the bore 166.

The valve block 164 is secured in any suitable manner such as welding to a mounting bracket 194 which is shaped to conform to an outer surface of the cylinder 136b. The mounting bracket 194 is in turn secured to the cylinder 136b by straps 196. The plunger 178 of the valve is actuated by a push rod 198 which is mounted on the cylinder 136b and its associated rod 142. One end of the push rod 198 is slidably mounted within an opening provided in a mounting bracket 200 which is carried by the cylinder 136b. The mounting bracket 200 is preferably formed in an integral part of the mounting bracket 194 for the valve 162. The opposite end of the push rod 198 is slidably mounted within an opening provided in a mounting bracket 202 carried by the rod 142 of the cylinder 136b. An adjustable stop member 204 is mounted on the push rod 198 intermediate the mounting brackets 200 and 202, and a compression spring 206 is mounted on the rod 198 intermediate the adjustable stop 204 and the mounting bracket 202. When the rod 142 of a cylinder 136b is retracted, the mounting bracket 202 will act against the spring 206 which will in turn act against the adjustable stop and move the push rod 198 into engagement with the plunger stem 190 to move the plunger into the inner end of the hollow nipple 170. The inner end of the hollow nipple 170 is tapered as at 208 to guide the plunger 178 into the nipple and movement of the plunger into the hollow nipple is limited by an internal shoulder 210.

The operation of the above-described depth control system is as follows: The weeder rods 72 are first lowered to the desired working depth by retracting the rods 142 and rocking the frames about the wheels 16. With the weeder rods at the desired depth, the push rod 198 is moved forwardly into engagement with the plunger stem 190 and the stop 204 is manually positioned so that the spring 206 is held against the mounting bracket 202. After making the one setting of the stop member 204, the weeder rod 72 can be raised and lowered to the original position without requiring any attention on the part of the operator. For example, if the weeder rods 72 are to be raised to turn around at the end of a field, the operator merely needs to move the valve 152 to the right to extend the cylinders 136. After the turn has been made, the weeder rods 72 can be lowered by moving the valve 152 to the left to retract the cylinders 136. When a cylinder 136b has been retracted to the extent indicated by the setting of the stop 204, the push rod 198 will contact the plunger stem 190 and push the plunger 178 into the end of the hollow nipple 170 and prevent further exhaust of fluid from the anchor ends of the cylinders 136. The plunger 178 will remain within the inner end of the nipple 170 until such time as the valve 152 is again moved to the right to supply fluid pressure from the pump 158 to the line 154 since the fluid pressure within the anchor ends of the cylinders 136 will act against the end of the plunger 178 to overcome the force of the spring 184. It should be noted that while the exhaust of fluid through the line 154 to the sump 160 is prevented, fluid is free to flow from any cylinder to any other cylinder so that one or more cylinders can be extended or retracted as long as it is accompanied by retraction or extension respectively, of one or more other cylinders. Additional retraction of the rod 142 for the cylinder 136b does not cause additional movement of the plunger 178 into the nipple 170, but rather merely compresses the spring 206 between the mounting bracket 202 and the adjustable stop 204.

While a single preferred embodiment of the invention has been described and illustrated, various modifications obvious to those skilled in the art can be made without departing from the underlying principles of the invention.

I claim:

1. In an agricultural implement including a transversely extending frame adapted to be moved forwardly over the ground and rockably mounted on transversely aligned forward wheels, a toolbar mounted on a rear portion of frame and adapted to carry earthworking tools whereby rocking movement of the frame about the forward wheels will raise and lower any tools mounted on the toolbar between working and transport positions, a plurality of gauge wheel means mounted on a rear portion of the frame for generally vertical movement with respect to the rear portion of the frame, the gauge wheel means being interconnected with the frame by a plurality of double-acting extensible and retractable hydraulic motors each comprising a cylinder having rod and anchor ends and a rod reciprocally mounted within the cylinder and projecting from the rod end thereof, whereby extension and retraction of the motors will raise and lower the rear portion of the frame by rocking the frame about the forward wheels, first fluid line means connecting the anchor ends of the cylinders in parallel, second fluid line means connecting the rod ends of the cylinders in parallel, third and fourth fluid line means connected respectively to the first and second fluid line means and being alternately connectible with a source of fluid pressure and a fluid reservoir whereby the toolbar can be raised and lowered by connecting the third and fourth fluid lines respectively to the source of fluid pressure, the improvement comprising: valve means movable between open and closed positions interposed in the third fluid line means, and means responsive to the retraction of the rod of one of the motors to a predetermined position to move the valve means to the closed position whereby after the toolbar has been lowered to a predetermined position additional lowering movement is prevented and the gauge wheel means will equally share the weight of the rear portion of the frame irrespective of the ground contour beneath the frame.

2. The implement set forth in claim 1 wherein the valve means is normally biased to the open position by spring means, and is retained in the closed position by fluid pressure with the anchor ends of the cylinders.

3. The implement set forth in claim 2 wherein the valve means is movable to the open position and is responsive to fluid pressure within the third fluid line means when the third fluid line means is connected to the source of fluid pressure.

4. The control system set forth in claim 3 wherein the means responsive to the retraction of one of the motors includes first and second support members mounted on the rod and cylinder respectively of the one motor, a push rod slidably carried by the support members for longitudinal movement, a stop member mounted on the push rod intermediate the support members, and means carried by the push rod between the first support member and the stop means and engageable by the first support member and the stop means, whereby retractive movement of the rod of the one motor is transferred to the push rod through the first support member, the means carried by the push rod and the stop member to move the push rod in a direction to move the valve means to the closed position.

5. The control system set forth in claim 4 wherein the stop member is adjustably mounted on the push rod.

6. The control system set forth in claim 5 wherein the means carried by the push rod and engageable by the first support member and the stop member includes compression spring means.

* * * * *